3,723,358
FABRIC TREATING SHAMPOO COMPOSITIONS
Lee W. Morgan and John R. Rogers, Racine, Wis., assignors to S. C. Johnson & Son, Inc., Racine, Wis.
No Drawing. Filed Feb. 22, 1971, Ser. No. 117,728
Int. Cl. C11d 1/10, 1/12, 3/20
U.S. Cl. 252—546                    11 Claims

ABSTRACT OF THE DISCLOSURE

Fabric treating shampoo composition comprising an aqueous solution of at least one anionic or nonionic surfactant, and a copolymer of about 50 to 60% styrene and 33 to 43% acrylic or methacrylic acid and up to about 13% of a viscosity modifying monomer such as isobutyl acrylate, said copolymer having a molecular weight from about 5,000 to about 50,000 and being water soluble at alkaline pH values.

FIELD OF INVENTION

This invention relates to novel compositions for fabric treating. More specifically, this invention relates to fabric treating shampoo compositions comprising a copolymer containing at least two monomers; and at least one surface active agent.

DESCRIPTION OF THE PRIOR ART

Fabric treating shampoo compositions are generally known in the art and have been widely used for treating textile fabrics, particularly rugs and carpeting. It is desirable in such compositions that they impart soil resistant properties to the treated surfaces. Many of the currently available shampoo compositions contain only surface active agents as the active components and thus rapid resoiling is common due to the oily or greasy nature of the residue left by these components. Even surface active agents which crystallize to a "dry" residue have a tendency to attract soil. Thus, these prior art compositions are frequently characterized by poor soil resistant properties resulting in rapid deterioration of the appearance of the treated textile fabrics and a necessity for frequent applications of the shampoo compositions.

SUMMARY OF THE INVENTION

It is, therefore, an object of the present invention to provide fabric treating shampoo compositions characterized by enhanced soil resistant properties and good cleaning ability.

Other objects of the present invention will be set forth in, or be apparent from the following detailed description of the invention.

These objects are achieved by the present invention which is directed toward novel fabric treating shampoo compositions comprising a copolymer containing at least two monomers, at least one surface active agent preferably an anionic or nonionic synthetic detergent and a liquid, preferably aqueous, diluent. Since the compositions contemplated by this invention will have widespread usage in the treating of pile fabrics, such as commonly found in rugs and carpeting, the present invention will be described with respect to these materials, though not limited thereto. The term "surface active agent" is used herein to denote a detergent compound, i.e., a substance that functions as a cleansing agent. Specific surface active agents which are useful in the present invention will be detailed hereinafter.

The copolymers of the present invention consist of at least a styrene monomer and a carboxylic acid-containing monomer and may also contain other monomers.

Styrene is a hard vinyl monomer whose homopolymers have a glass transition temperature, Tg, above about 100° C. and is a preferred monomer for use in this invention. The styrene monomer is present at from about 50% to about 65%, preferably about 55% to about 60% by weight of the total copolymer.

The carboxylic acid-containing monomers are polymerizable monoethylinically unsaturated compounds having one carboxylic acid group such as acrylic acid and its α-lower alkyl analogues such as methacrylic and ethacrylic acids. The preferred carboxylic acid-containing monomer is methacrylic acid. The carboxylic acid-containing monomer is present at from about 33% to about 43%, preferably about 35% to about 40% by weight of the total copolymer.

Other monomers may also be present in amounts up to about 13%. If such monomer is employed, it should be present in amounts ranging preferably from about 5% to about 10% by weight of the total copolymer. These monomers serve to modify hardness and viscosity. Specific examples of such monomers are the lower alkyl acrylates such as ethyl acrylate, n-propyl acrylate, n-butyl acrylate, and isobutyl acrylate; methyl methacrylate, acrylonitrile and methacrylonitrile. A preferred third monomer is iso-butyl acrylate.

It will be understood that the precise combination and ratio of monomers selected will depend upon the desired ultimate physical characteristic and the identity of the particular monomers employed. For example, copolymers high in styrene exhibit a greater degree of hardness whereas if the copolymer is too low in the carboxylic acid-containing monomer it will not be water soluble at alkaline pH values. The total copolymer content in the present invention is from about 0.5% to about 10.0%, preferably from about 1.5% to about 8.0% of the total composition.

The copolymers of this invention are water-soluble at alkaline pH values. Because of their composition and solubility, they have detergency properties, are relatively poor film formers, do not clog valve openings when packaged in aerosol containers and are easily removed from fabrics during recleaning. Further, the copolymers of this invention should have optical densities of less than 0.5 and molecular weight of from about 5,000 to about 50,000. Polymers of optical densities of greater than 0.5 are indicative of an emulsion rather than the desired clear solution. Optical densities are taken in an ammonium hydroxide solution at 10% solids and at a pH of 9.5. They are measured on a Bausch and Lomb spectrophotometer "Spectronic 20" with a ½" cell and a wave length of 500 millimicrons.

The surface active agents which are particularly useful in the present invention are anionic and nonionic synthetic organic detergents. These detergents can be used alone or in combination with other anionic or nonionic detergents.

Examples of anionic organic detergents are: alkyl glyceryl ether sulfonates; alkyl sulfonates; alkyl monoglyceride sulfates or sulfates or sulfonates; alkyl polyethoxy ether sulfonates; alkyl aryl sulfonates; acyl sarcosinates; acyl esters of isethionates; alkyl esters of sulphosuccinic acid; and alkyl phenol polyethoxy sulfonates. In these compounds, the alkyl and the acyl groups, respectively contain 10 to 20 carbon atoms. They are used in the form of water-soluble salts, for example, sodium, potassium and ammonium salts. Specific examples of the anionic organic detergents are sodium lauryl sulfate, sodium dodecyl sulfonate and sodium N-lauroyl sarcosinate.

Examples of nonionic organic detergents are: polyethylene oxide condensates of alkyl phenols wherein the alkyl group contains from 6 to 12 carbon atoms and the ethylene oxide is present in a molar ratio of ethylene oxide to alkyl phenol in the range of 10:1 to 25:1; condensation products of ethylene oxide with the product resulting from the reaction of propylene oxide and ethylene diamine wherein the molecular weight of the condensation products ranges from 5,000 to 11,000; the condensation product of from about 5 to 30 moles of ethylene oxide with one mole of a branched or straight-chain aliphatic alcohol containing from 8 to 18 carbon atoms; trialkyl amine oxides and trialkyl phosphine oxides wherein one alkyl group ranges from 10 to 18 carbon atoms and two alkyl groups range from one to three carbon atoms.

The total non-polymeric surface active agent content in the cleaning compositions of the present invention is from about 2.0% to about 15.0%, preferably from about 3.0% to about 12.0% by weight of the total composition. It is preferable, in order to achieve the desired results of this invention, that the ratio of polymer to surface active agent be within the range of from about 1:5 to about 5:1, preferably about 0.5:1 to about 5:1.

The fabric treating compositions can also contain various desired additives such as antistatic agents, optical brighteners, germicides, perfumes, deodorants, preservatives ro the like. The balance of the composition is made up of a liquid diluent, preferably water. The solubility of the copolymer is ensured by an alkaline pH, preferably a pH of about 8.5 to 10.5, resulting in a relatively clear solution.

The polymers employed in the present invention are most conveniently prepared by emulsion polymerization techniques. For example, the desired monomers, in the proper ratio, can be blended together and added over a period of about 40 to 60 minutes to an aqueous system under an inert gas blanket containing the desired detergent or detergent mixture and a suitable free radical initiator. Polymerization is carried out at a temperature of about 10° C. to about 100° C. for a period of time sufficient to effect polymerization of substantially all of the monomer present.

Suitable initiators include any of the known water-soluble free radical initiators including alkali metal persulfates; ammonium persulfate; hydrogen peroxide; and combinations thereof with suitable reducing agents such as sodium bisulfate. The initiators are present at from about 0.2% to about 2.0%, preferably about 0.5% to about 1.0% by weight of the total monomers.

It is preferable to also add a chain-transfer agent or chain-regulator in the polymerization reaction to produce a polymer having optimum molecular weight characteristics. Typical chain-transfer agents which can be used are long-chain mercaptans such as lauryl mercaptan; mercaptoacids such as β-mercaptopropionic acid and thioglycolic acid; allylic compounds; and halogenated hydrocarbons such as carbon tetrachloride, chloroform and bromotrichloromethane. The chain-transfer agents are present at from about 0.1% to about 4.0%, preferably about 0.5% to about 2.0% by weight of the total monomer.

As desired, additional surface active agent can be added after polymerization is complete to form the fabric treating composition, or the full amount of surface active agent can be added prior to carrying out the polymerization. The coppolymer is then adjusted to the desired alkaline pH and solids level, and other additives can be included.

The fabric treating shampoo composition of the present invention is applied to the rug or carpeting and is worked into the surface with a brush, sponge or the like. The treated fabric is then permitted to dry and upon drying, a substantially continuous film appears to form around the individual fibers. These films are relatively hard and brittle. Generally, the treated fabric will be brushed or vacuumed to remove the displaced soil and any loose residue from the composition. The treated fabric exhibits a high degree of resistance to resoiling which is characteristically different from fabrics treated with prior art compositions.

The fabric treating compositions of this invention may be packaged in any suitable container. They may be pressurized and made available in this form by means of the addition of a suitable propellant to the composition. Any propellant which can self-pressurize the composition and serve as the means for dispensing it from its container is suitable, including liquified gaseous propellants or inert compressed gases. The preferred propellants are liquidfied, normally gaseous propellants such as the known hydrocarbon and halogenated hydrocarbon propellants. The preferred normally gaseous hydrocarbon propellants include the aliphatic saturated hydrocarbons such as propane, butane, isobutane, and isopentane; the preferred halogenated hydrocarbons include chlorodifluoromethane, difluoroethane, dichlorodifluoromethane, and the like. Mixtures of two or more propellants can be used. The propellant is desirably utilized in an amount sufficient to expel the entire contents of the containers. In general, the propellant will be from about 5.0% to about 15.0%, preferably about 6.5% to about 10.0% by weight of the total composition. Pressurized forms of the compositions will generally be expelled from the container in the form of a thick, creamy foam. Non-pressurized compositions can be supplied as a concentrate to be diluted with water or as a fully constituted composition.

The following examples are given to illustrate embodiments of the invention as it is presently preferred.

It will be understood that these examples are illustrative and the invention is not to be considered restricted thereto except as indicated in the appended claims.

EXAMPLE I

A copolymer suitable for use in a fabric treating composition is prepared as follows:

|  | G. |
| --- | --- |
| Styrene | 180.0 |
| Methacrylic acid | 120.0 |
| Bromotrichloromethane (BTCM) | 6.0 |
| Sodium lauryl sulfate | 9.0 |
| Ammonium persulfate | 3.0 |
| Water (distilled) | 1785.0 |

This composition is prepared by heating the sodium lauryl sulfate in water to 80° C. under a nitrogen gas blanket in a reactor equipped with a stirring mechanism. The ammonium persulfate is first added and then the blend of monomers and BTCM are slowly added over a period of forty minutes. The reaction mixture is then maintained at reaction temperature for one hour and then cooled.

EXAMPLE II

A copolymer suitable for use in a fabric treating composition is prepared according to the procedures of Example I as follows:

|  | G. |
| --- | --- |
| Styrene | 165.0 |
| Iso-butyl acrylate | 30.0 |
| Methacrylic acid | 105.0 |
| Bromotrichloromethane | 6.0 |
| Sodium laurylsulfate | 9.0 |
| Ammonium persulfate | 3.0 |
| Water (distilled) | 945.0 |

EXAMPLE III

Fabric treating compositions are prepared as follows:

| | A | B |
|---|---|---|
| Sodium lauryl sulfate [1] | 20.729 | 20.729 |
| Sodium N-lauroyl sarcosinate [1] | 10.364 | 10.364 |
| Copolymer as prepared in— | | |
| Example I | 14.240 | |
| Example II | | 14.240 |
| Formaldehyde | 0.150 | 0.150 |
| Water (distilled) | 54.517 | 54.517 |
| Ammonia | (2) | (2) |

[1] 30% aqueous solution.
[2] Sufficient amount to adjust the pH to 9.

Each of the compositions is tested for "appearance loss" as follows. Two identical white, short pile nylon carpet pieces of carpet are cleaned, one with composition A and the other with composition B and conditioned 24 hours at room temperature and 80% room humidity. The pieces of carpet are then artificially soiled and vacuumed and readings are taken on the Hunter Laboratory Reflectometer and are 62.12 and 60.39 for compositions A and B, respectively. With these readings together with visual inspection, it is apparent that both compositions are very effective. The Hunter Reflectometer is useful for corroborating the difference between samples in a given series when a degree of difference may be difficult to establish from visual observation alone.

EXAMPLE IV

An intermediate composition is prepared containing the following:

| | Percent |
|---|---|
| Styrene/iso-butyl acrylate/methacrylic acid copolymer (55/10/35) | 6.417 |
| Sodium lauryl sulfate [1] | 12.188 |
| Sodium N-lauroyl sarcosinate [1] | 6.094 |
| Cetyl alcohol | 0.962 |
| Formaldehyde (37%) | 0.150 |
| Disodium phosphate | 0.588 |
| Water (distilled) | 73.601 |
| Ammonia | (2) |

[1] 30% aqueous solution.
[2] Sufficient amount to adjust the pH to 9.0.

The intermediate is introduced into an aerosol can and comprises about 93.5% by weight. The propellant, an iso-butane/propane mixture, is introduced into the can in the amount of about 6.5% by weight and the can is fitted with a foam dispensing valve and head. The composition is released from the container as a foam which is readily worked into a pile fabric. Fabrics treated with the composition are effectively cleaned and rendered resistant to resoiling for prolonged periods.

EXAMPLE V

A cleaning study is performed in order to correlate the ratio of copolymer to surface active agent with good cleaning results. Various ratios of the styrene/isobutyl acrylate/methacrylic acid to surface active agent are prepared in the composition of Example IV and the "brightness regain" is measured as follows. Pieces of identical carpeting are commercially washed and a Hunter Laboratory Reflectometer reading is taken (H.L. #1). The pieces of carpet are soiled naturally or artificially and then vacuumed and a Hunter Laboratory Reflectometer reading taken (H.L. #2).

The pieces of carpeting are then cleaned with the compositions to be tested and permitted to dry. The pieces of carpeting are then vacuumed again and a final Hunter Laboratory Reflectometer reading is taken (H.L. #3). The percent brightness regain is calculated as follows:

$$\text{Percent brightness regain} = \frac{\text{H.L. \#3} - \text{H.L. \#2}}{\text{H.L. \#1} - \text{H.L. \#2}} \times 100$$

The percent non-volatiles represent the amount of surfactant and polymer solids present in the composition and is maintained at 6.5%. The results obtained are shown in Table I.

TABLE I

| Composition | Ratio [1] | Percent brightness regain |
|---|---|---|
| 1 | (2) | 33.5 |
| 2 | 0.2:1 | 42.5 |
| 3 | 0.5:1 | 39.5 |
| 4 | 1:1 | 39.5 |
| 5 | 2:1 | 32.5 |
| 6 | 5:1 | 38.0 |
| 7 | (3) | 28.0 |

[1] Ratio of copolymer to surface active agent.
[2] 100% surface active agent.
[3] 100% copolymer.

A percent brightness regain of at least about 30 is considered very good. Optimum cleaning is found with compositions having a ratio between about 1:5 and 5:1. It is particularly noted that composition 7, which contained no additional surface active agent, was an effective cleaning composition, thus showing that the polymer alone was effective in removing soil from the fabric.

A study of soil resistant properties is performed in order to determine the ratio of polymer to surface active agent which is desirable to achieve good soil resistant properties. The same composition and ratios of the cleaning test can be utilized and are tested in accordance with the procedures of Example III. The results are shown in Table II.

TABLE II

| Composition | Ratio [1] | Reflectometer readings |
|---|---|---|
| 1 | (2) | 49.5 |
| 2 | 0.2:1 | 50.5 |
| 3 | 0.5:1 | 56.5 |
| 4 | 1:1 | 62.0 |
| 5 | 2:1 | 66.0 |
| 6 | 5:1 | 69.0 |
| 7 | (3) | 70.0 |

[1] Ratio of copolymer to surface active agent.
[2] 100% surface active agent.
[3] 100% copolymer.

In the foregoing table it will be apparent that a polymer to surfactant ratio of at least 0.5:1 provides good resoiling resistance whereas ratios of 5:1 or more provide the optimum in resoiling resistance. A composition which provides a proper balance between the two essential properties of cleaning and resistance to resoiling would have an optimum ratio of polymer to surfactant ranging from about 0.5:1 to 5:1.

What is claimed is:

1. A fabric treating composition consisting essentially of an aqueous solution of from about 2 to about 15% of at least one surface active agent selected from the group consisting of anionic and nonionic detergents and from about 0.5 to about 10.0% of a copolymer of at least from about 50 to 65% styrene and from about 33 to 43% of an ethylenically unsaturated carboxylic acid selected from the group consisting of acrylic acid and methacrylic acid, and up to about 13% of a viscosity modifying monomer selected from the group consisting of lower alkyl acrylates, methylmethacrylate, acrylonitrile, and methacrylonitrile, said copolymer having a molecular weight from about 5,000 to about 50,000 and being water soluble at alkaline pH values.

2. The composition of claim 1 wherein the copolymer comprises styrene and methacrylic acid.

3. The composition of claim 1 wherein the copolymer comprises from about 55 to 60% styrene; about 35 to 40% methacrylic acid and about 5 to 10% iso-butyl acrylate and has a molecular weight within the range of from about 5,000 to 50,000.

4. The composition of claim 1 wherein the surface active agent comprises sodium lauryl sulfate.

5. The composition of claim 1 wherein the surface active agent comprises a mixture of sodium lauryl sulfate and sodium N-lauroyl sarcosinate.

6. The composition of claim 1 wherein the ratio of copolymer to surface active agent is within the range of about 0.5:1 to about 5:1.

7. In a pressurized container, a fabric treating composition consisting essentially of an aqueous solution of from about 2 to about 15% of at least one surface active agent selected from the group consisting of anionic and nonionic detergents; from about 0.5 to about 10.0% of a copolymer of at least from about 50 to 65% styrene and from about 33 to 43% of an ethylenically unsaturated carboxylic acid selected from the group consisting of acrylic acid and methacrylic acid and from about 5.0 to about 15% of at least one propellant selected from the group consisting of liquefied, normally gaseous hydrocarbon and halogenated hydrocarbon propellants, said copolymer having a molecular weight from about 5,000 to about 50,000 and being water soluble at alkaline pH values.

8. The composition of claim 7, wherein the copolymer comprises styrene and methacrylic acid.

9. The composition of claim 7, wherein the copolymer comprises styrene, iso-butyl acrylate and methacrylic acid.

10. The composition of claim 7, wherein the surface active agent comprises sodium lauryl sulfate.

11. The composition of claim 7, wherein the surface active agent comprises a mixture of sodium lauryl sulfate and sodium N-lauroyl sarcosinate.

References Cited
UNITED STATES PATENTS

| | | | |
|---|---|---|---|
| 3,497,456 | 2/1970 | Goodell | 252—546 |
| 3,574,124 | 4/1971 | Lyness et al. | 252—546 X |
| 3,161,460 | 12/1964 | Huber | 252—305 X |
| 3,503,892 | 3/1970 | Weyna et al. | 252—550 |

RICHARD D. LOVERING, Primary Examiner

U.S. Cl. X.R.

252—90, 527, 550, DIG 2, DIG 3, DIG 13, DIG 14